Oct. 8, 1963

R. INGRAM 3,106,052

WINDROW FORMING DEFLECTOR

Filed Aug. 25, 1961

INVENTOR.
ROY INGRAM
BY
Emerson B Donnell
ATTORNEY

United States Patent Office 3,106,052
Patented Oct. 8, 1963

3,106,052
WINDROW FORMING DEFLECTOR
Roy Ingram, 607 Richardson, Artesia, N. Mex.
Filed Aug. 25, 1961, Ser. No. 133,872
4 Claims. (Cl. 56—1)

This invention relates to crop treating implements such as hay conditioners of the type adapted to pass over previously harvested crop as hay, for example, picking up a swath, crushing or otherwise treating the material by means of rollers or the like, and throwing it out in a stream of comparable width in a rearward and generally upward direction. It relates especially to a guide or deflector to confine the stream being discharged to a form that assures a uniform curing of the crop after it is deposited on the ground.

Crop treating implements such as hay crushers or conditioners, because of the length of the rollers that engage the crop, permit the latter to "fan" out laterally on the ground into a shallow layer or swath. These machines are of the general type shown in the patents to Reed 2,345,715, and Cunningham 2,711,622. In this type of crop conditioning, it is known that the crop would cure better if compacted or formed into a windrow, and an object of the invention is to generally improve crop conditioners along these lines.

Another object of this invention is to provide a windrow-forming guide or deflector that will direct the crop being discharged from a crop conditioner to form a windrow so as to effect improved curing.

Another object is to provide a guide means or deflector that will engage streams of various densities and thereby control the width of the resulting windrows.

Further objects and advantages of the invention will become apparent from a consideration of the following detailed description taken in connection with the accompanying drawings, wherein an illustrative, preferred embodiment of the invention is shown. However, it is to be understood that the invention is not limited to the details disclosed, but includes all such variations and modifications as fall within the spirit of the invention.

Referring to the drawing:

FIG. 1 is a fragmentary elevational side view of a typical crop conditioner or crop treating implement with parts broken away and to which the invention is attached.

FIG. 2 is a plan view of a portion of the invention as viewed at 2—2 of FIG. 1.

FIG. 3 is a fragmentary section taken at 3—3 of FIG. 2.

FIG. 4 is an enlarged fragmentary section taken at 4—4 of FIG. 3, and

FIG. 5 is a diagrammatic plan view of a portion of the invention showing the progress of a stream of crop material being acted upon by the elements of this invention.

A portion of a typical machine 10 is shown in FIG. 1, having a pair of crop-treating rollers 12 and 14 which are mounted for rotation in the direction of arrows 17 and 19 and within a casing 16 and power driven. A discharge region or opening 18 is provided rearwardly in casing 16 from which a crop 20 is discharged with considerable force and velocity after passing between rollers 12 and 14.

The crop 20, as it leaves the rollers is directed upwardly and rearwardly, as indicated in FIG. 1, and by a directional line 21, as in FIG. 3, and with sufficient force to travel a considerable distance if not intercepted. A hood, baffle, or support 24 of a transverse width substantially that of casing 16 is provided, which is of sheet metal in this instance, and positioned generally upwardly and rearwardly relatively to the rollers 12 and 14 and over the discharge region 18. Hood 24 is pivoted to the casing 16 in the manner shown in FIGS. 1 and 2 by pivot means 26. This pivot means is conventional and need not be further described except to say that it permits the hood 24 to pivot freely about a transverse axis and permits adjustment of the hood for a purpose which will be made clear as this description progresses. Hood 24 extends generally rearwardly as shown, and includes a panel 28 and a second panel portion 30, which is disposed at an angle to the panel 28. Portion 30 terminates in a lip 32 which provides the necessary stiffness for the panel 30. Panels 28 and 30 are given fore-and-aft stiffness by downwardly-extending lips 34 and 35.

Hood 24 is supported in any of several selective positions by means of adjustment bars 36, one being located at each end of panel 28 adjacent lip 34. Brackets or supports 38 are provided, one being secured to casing 16 at each end of the latter in any conventional manner and which brackets can be of angle iron or other suitable form. Brackets 38 extend rearwardly to a convenient point above hood 24. Adjustment bars 36 are pivoted at their upper ends on pivot bolts 40 or other suitable means, so as to swing freely. Holes 42 are provided in bars 36 having longitudinal spacing along the bars, as shown. One of these holes in each of bars 36 is selectively engaged with a clamp bolt 44 which is inserted in a hole provided in one of the flanges 34 of panel 28. Thus, several positions of adjustment of hood 24 can be selected, depending upon the density of the crop being treated or other conditions, in order to obtain the proper interception and windrowing of the crop that is being discharged rearwardly by the treating rollers 12 and 14.

An adjustable deflecting panel or baffle 46 is provided which is co-extensive with deflecting panel 30 and which extends generally rearwardly and downwardly adjacent the lip 32. Deflecting panel 46 is provided with pivot brackets 48 which are welded or otherwise secured to the ends of the panel. A pivot means such as bolt 50 is provided at each end and passes through an aperture in the bracket 48 and through flange 35 of panel 30.

An adjustment arm 52 is pivoted at each end of hood 24 by a pivot bolt 54. These adjustment arms extend downwardly and rearwardly and are provided with slots 56. A bolt 58 passes through each of slots 56 and into one of a pair of flanges 59 of deflecting panel 46 to provide an adjustment securing means for panel 46 relative to panel 30.

A pair of wings 60 is provided for constricting the stream of material coming from rollers 12 and 14, which wings depend substantially vertically from the underside of the panel 28, as shown in the drawings. These wings comprise sheet metal panels 62 secured to panel 28 in rearwardly converging relation, in a manner so as to permit free swinging of the wings in response to the pressure of the streams of crop material passing between the wings. The streams are constricted in lateral dimension by the wings as the windrow is formed.

Wings 60 are of the general shape of a quadrilateral as shown, and each is provided with an upper horizontal lip 64 to provide the necessary stiffness. A hinge member 66 extends the length of the upper edge of panel 62 and in this instance is of fabric, rubber, or similar material that will flex readily, and which may be chosen to have a desired degree of stiffness. An angle member or fastening means 68 is provided which is secured to the underside of panel 28 by pivot bolts 70 (see FIG. 2) spaced apart on the order of the lateral dimension of the casing 16, and by adjusting bolts 72. Bolts 72 pass through angle member 68 and one of a series of holes 74 which are provided in panel 28, which, with bolt 70, provide a means for adjusting the amount of convergence of wings 60 relative to each other and to secure the wings to the panel 28. Rivets 76 of a suitable number are passed through hinge 66, panel 62, and angle member 68, thereby securing these members in one unit.

In summarizing the operation of this device, the machine is transported forwardly over a field of mowed crop in the direction of arrow 77 and the crop is nipped or caught between the rollers 12 and 14 and passed through, and in so passing, is bruised or otherwise treated so as to hasten the curing on the field. In order to handle a substantial quantity of the crop, the rollers 12 and 14 are of a considerable length resulting in the discharge of a wide stream rearwardly. It is the purpose of the invention to narrow this stream to form a narrow windrow as the crop is deposited on the ground. The crop which is discharged upwardly and rearwardly against the underside of hood 24 and panel 46 is deflected downwardly to the ground. However, in passing from the rollers of this deflecting panel, the crop stream strikes the inner surfaces of the rearwardly-converging depending wings 60 which tend to consolidate and narrow it. As the crop emerges from the rear edges of wings 60, it will be constricted and will fall in a deep windrow of restricted lateral width and one which will be more open and permit wind to blow through laterally, thus assuring that the crop will be more uniformly cured, than one that is permitted to lie flat on the ground and only cure on the upper surface. In the latter instance, an extra operation of turning is often necessary in order to properly cure such a crop.

The above being a complete description of an illustrative embodiment of the invention, what is claimed as new and desired to be secured by Letters Patent of the United States is:

1. In a crop conditioner of the type adapted to advance over a field of previously harvested crops such as hay and the like and having relatively wide crop conditioning means transverse to the line of advance and normally adapted to pick up, condition and discharge crops upwardly and rearwardly in a stream of comparable width and a comparably wide upwardly and rearwardly directed
hood carried by the conditioner rearwardly of the conditioning means to intercept and guide the discharged crops; the improvement comprising a pair of depending
deflector wings, each having front and rear and top and bottom edge portions; and
means for mounting the wings on the conditioner in a position depending from the underside of said hood with their front edge portions respectively adjacent to opposite outer ends of the conditioner means and their rear edges upright and closely spaced apart transversely so that the sheets converge rearwardly to direct the rearwardly discharged crops into a relatively narrow stream, said mounting means including
fastening means on said hood,
hinge means supported by said fastening means and connected in supporting relation with the top edge portions of said deflector wings, and said fastening means having another position on said hood for positioning said sheets with their rear edges at a different spacing whereby to effect an adjustment in the degree of rearward convergence of the sheets.

2. In a crop conditioner of the type adapted to advance over a field of previously harvested crops such as hay and the like and having relatively wide crop conditioning means transverse to the line of advance and normally adapted to pick up, condition and discharge crops upwardly and rearwardly in a stream of comparable width and a comparably wide upwardly and rearwardly directed
hood carried by the conditioner rearwardly of the conditioning means to intercept and guide the discharged crops, the improvement comprising a pair of depending
deflector wings, each having front and rear and top and bottom edge portions; and
means for mounting the wings on the hood with their front edge portions respectively adjacent to opposite outer ends of the conditioner means and their rear edges upright and closely spaced apart transversely so that the sheets converge rearwardly to direct the rearwardly discharged crops into a relatively narrow stream, said mounting means including
fastening means on said hood,
hinge means comprising a member of flexible material supported by said fastening means and connected in supporting relation with the top edge portions of said deflector wings, and in supported relation with the underside of said hood.

3. In combination with a crop treating machine having crop treating elements and a crop discharge region, a
support in said crop discharge region, a crop intercepting baffle on said support,
guide wings spaced at the sides of said region, and
flexible members connecting said wings with the support in depending relation to said support, in converging relation to the crop material discharging through said discharge region, and positioned to engage the crop material between said crop treating elements and said crop intercepting baffle, and said flexible members being of a degree of stiffness to permit said wings to be forced apart to accommodate abnormally heavy streams of material.

4. In combination with a crop treating machine having crop treating elements and a crop discharge region, a
hood in said crop discharge region disposed above a stream of crop material discharging through said crop discharge region,
guide wings spaced at the sides of said region, and
hinge means connecting said wings with the underside of the hood in depending relation to said hood, in converging relation to the crop material discharging through said discharge region, and positioned to engage the crop material between them and to be forced apart to accommodate abnormally heavy streams of crop material.

References Cited in the file of this patent
UNITED STATES PATENTS

| | | |
|---|---|---|
| 2,911,780 | Brady | Nov. 10, 1959 |
| 2,915,869 | Coultas | Dec. 8, 1959 |
| 2,918,776 | Coultas | Dec. 29, 1959 |